United States Patent [19]

Boggs et al.

[11] 3,916,676

[45] Nov. 4, 1975

[54] METHOD OF AND APPARATUS FOR MEASURING AUTOMATICALLY SUCCESSIVE SECTIONS OF AN ELONGATED MATERIAL

[75] Inventors: Luther Miles Boggs; Howard John Flichman; James Alphus Hudson, Jr., all of Atlanta; Johnny William Levengood, Tucker, all of Ga.

[73] Assignee: Western Electric Company, Incorporated, New York, N.Y.

[22] Filed: July 5, 1972

[21] Appl. No.: 268,973

[52] U.S. Cl............................. 73/67.8 S; 73/67.9
[51] Int. Cl.² ........................................ G01N 29/04
[58] Field of Search............ 73/67.7, 67.8 R, 67.8 S, 73/67.9

[56] References Cited
UNITED STATES PATENTS

| | | | |
|---|---|---|---|
| 3,372,576 | 3/1968 | Dory .................................... | 73/67.9 |
| 3,423,992 | 1/1969 | Dory .................................... | 73/67.9 |
| 3,474,664 | 10/1969 | Mitchell et al....................... | 73/67.9 |
| 3,509,752 | 5/1970 | Moore ................................. | 73/67.9 |
| 3,605,504 | 9/1971 | Kummer, Jr. et al................ | 73/67.7 |

*Primary Examiner*—Richard C. Queisser
*Assistant Examiner*—John P. Beauchamp
*Attorney, Agent, or Firm*—E. W. Somers

[57] ABSTRACT

In measuring ultrasonically automatically the thickness of a jacket of a cable being advanced along a predetermined path provisions are made for pulsing sequentially each one of four crystal transducers equiangularly deployed about the periphery of the advancing cable and spaced therefrom with at least the portions thereof facing the cable being immersed in a coupling medium. As each of the crystals is pulsed to emit ultrasonic waves to engage the cable, successive ones of first echo pulses from the outwardly facing surface of the jacket and of associated second echo pulses from the inwardly facing surface of the jacket are received and amplified. A receiver logic circuit is provided for causing the measurement of a time interval related to the time between the echo pulses and to the jacket thickness. The receiver logic circuit is provided with intelligence responsive to a sequence of valid first and second echo pulse pairs as determined by a consideration of amplitude and duration characteristics for the conversion of the measurement into a signal, the magnitude of which is proportional to the thickness of the cable jacket. Facilities are provided for displaying to an operator the thickness of the jacket and for converting the thicknesses into eccentricity measurements.

16 Claims, 6 Drawing Figures

METHOD OF AND APPARATUS FOR MEASURING AUTOMATICALLY SUCCESSIVE SECTIONS OF AN ELONGATED MATERIAL

BACKGROUND OF THE INVENTION

1. Field of the Invention

This invention relates to methods of and apparatus for measuring a strand material, and, more particularly, to methods of and apparatus for measuring ultrasonically the thickness and eccentricity of a jacket extruded about a cable being advanced along a predetermined path.

2. Prior Art and Technical Considerations

In one example of a cable constructed for use in the communications industry, a metallic moisture barrier is wrapped longitudinally about a cable core being advanced along a predetermined path with the overlapping edges of the moisture barrier bonded together to form a watertight seam. Thereafter, a jacket of a plastic material is extruded over the core and moisture barrier with the jacket in some cable codes bonded to the outwardly facing surface of the moisture barrier. Then the jacketed cable is passed through a relatively long water trough to reduce the temperatue of the jacket.

It is desirable to monitor continuously the jacket wall thickness as well as the eccentricity of the jacket. Monitoring of the jacket facilitates the maintenance of a uniform thickness of the jacket and the conservation of the consumption of the plastic material by applying the minimum acceptable jacket thickness. The monitoring of the eccentricity is of assistance in making adjustments to the extrusion apparatus to prevent the final product from being "out-of-round".

In one prior art method of monitoring the thickness of a plastic jacket extruded over a metallic moisture barrier, the capacitance is measured between the metallic barrier and an electrode placed in direct contact with the plastic jacket. The measured capacitance is a function of the dielectric constant of the plastic material and the distance between the electrode and the metallic barrier, that distance being the jacket thickness.

This prior art method is satisfactory when the dielectric constant of the plastic is independent of temperature or when a plastic, the dielectric constant of which is not independent of temperature, is maintained accurately at a predetermined temperature. However, when measuring the capacitance of a plastic, the dielectric constant of which is not independent of temperature, an inaccurate measurement will probably be obtained because the temperature of the plastic varies due to the heat resulting from bonding the metallic barrier and the heat from the extrusion of the plastic onto the sheath.

Another problem manifests itself when attempting to measure dynamically the thickness and eccentricity of an inner jacket. Since there is no metallic moisture barrier surrounding the inner jacket at that point, conventional techniques may not be used. In those situations, end samples were taken off the final product with an attempt then made to adjust the extruder where necessary. Clearly, there was a need for a jacket thickness and eccentricity measurement apparatus which could be used on any structural arrangement of cable construction.

Also, it is desirable to monitor the jacket thickness as soon as possible after the plastic has been extruded onto the cable core. In this way, information may be communicated to a control system to control continuously effectively the extrusion apparatus. In many of the prior art methods of monitoring cable jacket thickness in the manufacture of telephone cable, the monitoring is accomplished after the cable is passed out of the water cooling trough. This is necessary since the prior art methods have usually involved contacting type measurement devices which of necessity should not be engaged with the cable jacket until the temperature of the cable jacket has been reduced.

For example, successive sections of a cable jacket were monitored by a single probe mounted for movement spirally about the advancing cable. By the time such a system monitored and recorded the thickness of opposite wall sections of the cable, the cable had been advanced through an appreciable distance. Hence, the thickness of the wall sections compared were at points spaced longitudinally along the cable. Such measurements are not truly representative of cable concentricity, that is to say, values of diametric wall sections essentially in the same cross-sectional plane of the cable. There have been advances since the advent of this system.

In one prior art method, as disclosed in U.S. Pat. No. 3,407,352 issued on Oct. 22, 1968 in the name of William M. Smith, a first magnetic coil is supported slidably against the jacket with a second magnetic coil supported a fixed distance away from the jacket. A spacer insulator is slidable against the jacket and is mounted between the second coil and the jacket to maintain the fixed separation therebetween. The coils are connected as two arms of a measuring bridge. The bridge and thus the coils are energized electrically with out-of-phase signals produced in the coils being indicative of jacket thickness. The coils are spaced axially apart along the cable to avoid magnetic coupling between the coils. Detecting facilities in one cross arm of the bridge measures the phase difference between the signals and thus provides a direct reading of the thickness of the extruded plastic jacket in the water cooling trough immediately after the cable is advanced out of the extrusion apparatus.

Investigations have been continued to develop still further improved techniques for the measurement of the thickness and eccentricity of a polyethylene cable jacket.

One currently used system for monitoring diametrically opposed conductor cable sections to measure sheath thickness and eccentricity is disclosed in U.S. Pat. No. 3,500,185 issued on Mar. 10, 1970 in the name of W. T. Eppler. A pair of probes are mounted on an indexable head and spaced to engage diametrically opposite wall sections of an advancing cable. The probes are switched alternately into and out of one arm of a capacitance test set bridge for measuring cable jacket thickness. Another bridge arm includes a reference-standard capacitor representative of a preset desired jacket wall thickness with which the monitored value of capacitance is compared.

The system is arranged to index the head and probes into four sensing positions about the cable axis. A pair of graphs corresponding to the alternate measurements are made and represent measurements of diametrically opposed jacket wall thicknesses. Should the thickness of the extruded plastic jacket vary, the rate of variation is low. Consequently, longitudinally adjacent measurements of diametrically opposed jacket wall sections are essentially as effective and reliable as diametric measurements in the same plane of the cable.

It should also be observed that even this relatively new monitoring system is not used to monitor the inner jacket of certain types of cable construction since capacitance measurement is dependent on having a metallic shield.

Measurement of the thickness following extrusion will, of necessity, introduce a transport lag in the control system. This lag should be as small as possible by performing the thickness measurement as close to the extruder as possible. But, the plastic material is in a semi-solid state after emerging from the extruder. Clearly, there was a need for an automatic non-contacting measurement apparatus which may be used in the vicinity of the extruder.

A non-contacting jacket thickness measuring apparatus essentially optimizes the feedback control system connected to the extruder or with results displayed for use by an operator in making adjustments to monitor eccentricity and jacket thickness. This will permit the conservation of jacketing material by controlling continuously the application thereof. Also, the apparatus for monitoring continuously automatically jacket thickness should have the capability of avoiding unequal jacket thickness at diametrically opposite wall sections of the jacket. This, of course, will avoid unequal distribution of stresses during the bending of the cable.

Other advantages accrue to a non-contacting device. Excessive wear is experienced with a contacting probe which causes poor readings. This necessitates high maintenance costs.

However, since the cable is advanced almost immediately into a cooling bath, the test device must not be adversely affected by the water, or in the alternative, must not be required to be immersed in the water.

Finally, the test device must have the capability of producing outputs indicative of jacket thickness and suitable for use in a feedback loop to control automatically the thickness and the eccentricity of the jacket.

Several systems may be considered as meeting these requirements. Of these, an ultrasonic system was deemed to be the most advantageous. In an ultrasonic system, (1) the measurement can be made without having a sensor engage the jacket, (2) the water environment of the cooling trough is of help in performing the measurement in that ultrasonics requires a couplant that is readily available, and (3) operating frequencies and time measurements between two returning signals will be of an order of magnitude which is reasonable in a manufacturing facility.

Ultrasonic techniques for measuring thickness in solids have been used in the prior art and usually center about two techniques. One is a pulse echo technique in which the pulse is transmitted and the system awaits the echo to return. This is similar to a sonar system in which distances are measured by determining the time interval between a generated pulse and the echo thereof. The sound wave pulse is generated by a crystal transducer which is also used to pick up the return pulses. The return pulses are processed in a receiver, and the time difference between the return echo from the outer surface and the return echo from the inner surface is a measure of the jacket thickness.

A second ultrasonic technique is what is referred to as a resonance technique. This technique operates on the principle of a peaking of a return signal as the wave length of the ultrasonic signal approaches an integral multiple of the thickness of the article under test.

The application of the pulse echo technique to measuring thickness and eccentricity seems to be ideal. An ultrasonic apparatus includes a crystal, the more commonly used ones being lead zirconate ceramic, niobate, quartz, lithium sulphate and barium titanate. Metal is deposited on either side of a cut crystal to provide an electrically conductive surface.

The crystal is stimulated or shock-excited electrically by using a high voltage potential to create a mechanical ringing of the crystal. The mechanical motion is transmitted in the form of a pressure or sound wave through the couplant, e.g., water of the cooling trough in this application, to the cable being measured.

Depending upon the acoustical mismatch between the couplant and the article, e.g., cable, under test, a portion of the sound wave energy will be reflected and a portion will continue on through the media of the article under test. At each interface of the article, a similar transformation occurs.

More particularly, an ultrasonic crystal that has a resonant frequency in the mega hertz region is pulsed and a ringing signal is transmitted through the water of the cooling trough to the cable jacket where part of the signal is reflected off the outer surface and returns to a receiver. A second reflection, or echo, occurs off the inner surface of the jacket and reaches the receiver subsequent to that from the outer surface by a time difference that relates directly to the thickness of the cable jacket. The echo signals are processed to produce a measure of the thickness of the jacket.

Generally, in the past, in the ultrasonic measurement of elongated material such as tubing, a crystal having a line focus has been positioned with the line focus parallel with the longitudinal axis of the tubing. However, in tube-making, the rigidity of the tube precludes any significant motion laterally of the successive sections of the tube. this is unlike the lateral motion experienced as the successive sections of a cable are moved through the cooling trough.

In one commercially available ultrasonic measuring apparatus, facilities are provided for an approximate 100 volt excitation of crystal with provisions for detecting minimum amplitudes having one polarity. There are no provisions for verifying the validity of the echo pulses received. Moreover, the apparatus is controlled manually by an experienced operator who, with the assistance of an oscilloscope, looks for a sequence of echoes with variable time delay therebetween. This is not the type of apparatus conducive to use in a high speed modern cable manufacturing environment.

In U.S. Pat. No. 3,423,992 an ultrasonic apparatus is used to measure thickness by utilizing the pulse echo technique. An oscillator excites a transducer immersed ini water. Pulse echoes from a first reflecting surface of a tube being continuously advanced through the water and a second reflecting surface cause a square wave voltage to be generated and applied to an amplifier. The amplifier selects the bottom echoes and applies a wave form corresponding thereto to a trigger circuit.

Square waves produced by the trigger circuit operates a recorder to which is also applied a saw-tooth voltage applied by a device controlled by the receiver. To prevent the generation of saw-tooth forms despite the disappearance of a bottom echo due to surface defects, the saw-tooth voltage is applied to the recorder only in the presence of square waves.

Facilities are provided and connected to the measuring facilities such that when the trigger circuit is switched on, the measuring facilities are operated, and when switched out, the operation of the measuring facilities is inhibited. The trigger circuit is controlled merely by an echo pulse reflected from the second reflecting surface. Preferably, the trigger circuit is controlled by a logic system which tests the characteristics of echo pulses and not by the mere presence of an echo pulse.

The operation of the latter mentioned apparatus is apparently based on the assumption that if a first bottom echo is received, that a second bottom echo will follow. While such a system may suffice for measuring tubing, additional sophistication is desired when testing a cable being advanced with accompanying lateral motion. Moreover, the latter mentioned patent discloses apparatus for generating a signal having an amplitude proportional to the time interval which separates two successive echo pulses reflected from the second reflecting surface. Desirably, for measuring cable jacket thickness, a system should generate a signal having an amplitude proportional to the time interval which separates echo pulses from the two surfaces which define the jacket thickness.

In another commercially available ultrasonic apparatus (see U.S. Pat. No. 3,509,752), a transducer is excited by a device triggered by a clock pulse. Reflected front and back surface echo pulses from an article are coupled to a receiver which converts the received energy bursts into spaced rectangular pulses which are coupled to a gauge unit. The gauge unit is gated by a clock pulse which is suitably delayed and allows only the front and back surface pulses to pass. A DC voltage proportional to the spacing between the front and back surface pulses, and hence, the thickness, is generated as the apparatus output. In this apparatus, the transducer is coupled acoustically to an accessible surface of the article under test and a filter is provided for forming cycle pulses of a signal received from a comparator circuit into a single pulse.

Known ultrasonic pulse echo techniques are satisfactory when the thickness of the workpiece is large enough that proper resolution of the echo pulses can be realized. However, for very thin materials or workpieces, the time interval between returning echo pulses from the top and bottom surfaces become so small that the pulse widths of the echoes overlap and cause considerable difficulty in resolving the pulses.

At least one prior art patent (U.S. Pat. No. 3,474,664) discloses provisions for providing an analog output indicative of the thickness of a workpiece even though the time interval between successive echo pulses from the top and bottom surfaces of the material may be too short to enable any recognizable signal to be generated during such time interval. Measuring facilities, connected to a pulse transmitter and receiver, develop an on signal and an off signal being directly proportional to and at least twice as long as the elapsed time between the transmission of a pulse into the top surface of the workpiece and the receipt of a corresponding echo pulse at the top surface after reflection from the bottom surface. A tuned circuit is used to improve accuracy and to discriminate against interference signals.

This, of course, is of help in measuring thin workpieces. By providing a time duration in this manner, a reliable output signal is produced which reflects the thickness since any variations in the thickness will be inherent in each of the time intervals making up the duration and hence measured in the measuring time duration.

However, the prior art does not include facilities tailored to the particular needs of monitoring the thickness and eccentricity of successive sections of a cable jacket immediately following extrusion and capable of measuring only those signals which are meaningful while the cable is being advanced.

SUMMARY OF THE INVENTION

It is an object of this invention to provide methods of and apparatus for measuring ultrasonically successive sections of an elongated material.

It is also an object of this invention to provide methods of and apparatus for measuring ultrasonically the thickness and eccentricity of successive sections of a cable jacket without contacting the surface of the jacket as the cable is being advanced.

Further, it is an object of this invention to provide methods of and apparatus for measuring ultrasonically jacket thickness and eccentricity and being capable of discriminating among signals relevant to a desired parameter determination and those signals which should be ignored.

It is another object of this invention to provide methods of and apparatus for measuring the inner jacket thickness as well as the thickness of the outer jacket.

It is still another object of this invention to provide methods of and apparatus for the generation of a control pulse subsequent to the satisfaction of predetermined duration-amplitude parameters.

It is a still further object of this invention to provide methods of and apparatus for providing data to control an extruder based on measurements of an extruded material while minimizing the time lag between extrusion and measurement.

It is an additional object of this invention to provide methods of and apparatus for causing a transducer to emit pressure waves while preventing the incursion of spurious noise signals.

It is yet another object of this invention to provide methods of and apparatus for automatically examining successive echo pulses in an ultrasonic testing of an article with respect to time duration and threshold amplitudes of the echoes together with the determination of the existence of a spacing between the pulse echoes and for the generation of a control pulse providing predetermined conditions are met.

A method of monitoring automatically ultrasonically successive sections of an elongated material embodying the principles of this invention includes the steps of advancing successive sections of the elongated material, transmitting an ultrasonic pulse into the material and then receiving a first echo pulse reflected from one surface of the material and then receiving an associated second echo pulse from an opposite surface of the material, developing an on signal and an off signal with the time duration between the on signal and the off signal being related to the elapsed time between the receipt of the first echo pulse from the one surface of the material and the receipt of the associated second echo pulse from the opposite surface of the material, the on and the off signals being developed automatically only upon receipt of associated first and second echo pulses having predetermined minimum amplitudes and with the second pulse occurring after a predetermined time interval following the beginning of the first pulse, and measuring the elapsed time between the on signal and the off signal.

An apparatus for monitoring automatically ultrasonically successive sections of an elongated material embodying the principles of this invention includes facilities for advancing successive sections of the elongated material, facilities for transmitting an ultrasonic pulse into the material and then receiving a first echo pulse reflected from one surface of the material and then receiving an associated second echo pulse from an opposite surface of the material, facilities for developing an on signal and an off signal with the time duration between the on signal and the off signal being related to the elapsed time between the receipt of the first echo pulse from the one surface of the material and the receipt of the associated second echo pulse from the opposite surface of the material, the on and the off signals being developed automatically only upon receipt of associated first and second echo pulses having predetermined minimum amplitudes and with the second pulse occuring after a predetermined time interval following the beginning of the first pulse, and facilities for measuring the elapsed time between the on signal and the off signal.

Other objects and features of the present invention will be more readily understood from the following detailed description of specific embodiments thereof when read in conjunction with the appended drawings.

DETAILED DESCRIPTION

General Overall Arrangement

Figure 1:
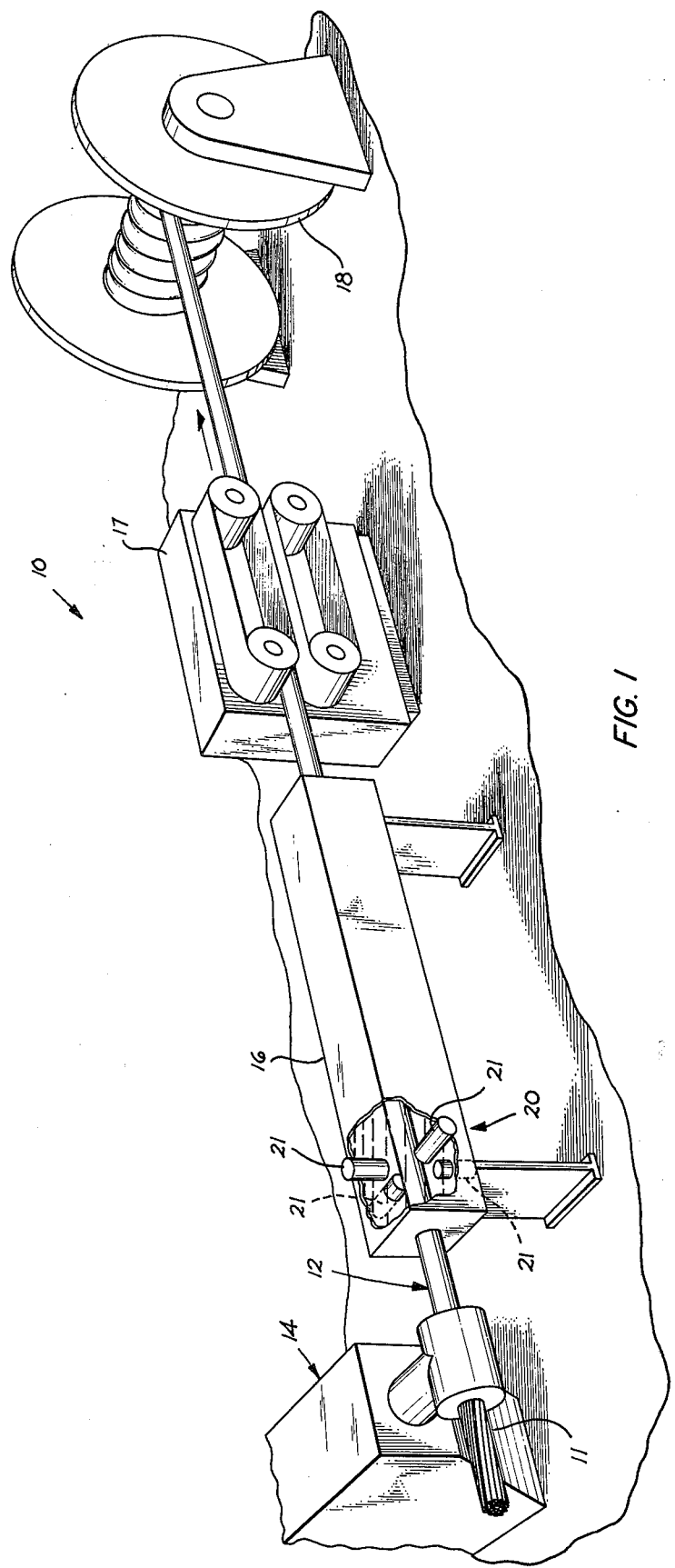
FIG. 1 is an overall view in perspective of a line for extruding a jacket of a plastic material about successive sections of a core of insulated conductors and showing an ultrasonic apparatus embodying the features of this invention for measuring the thickness and eccentricity of successive sections of the cable jacket.
Figure 2:
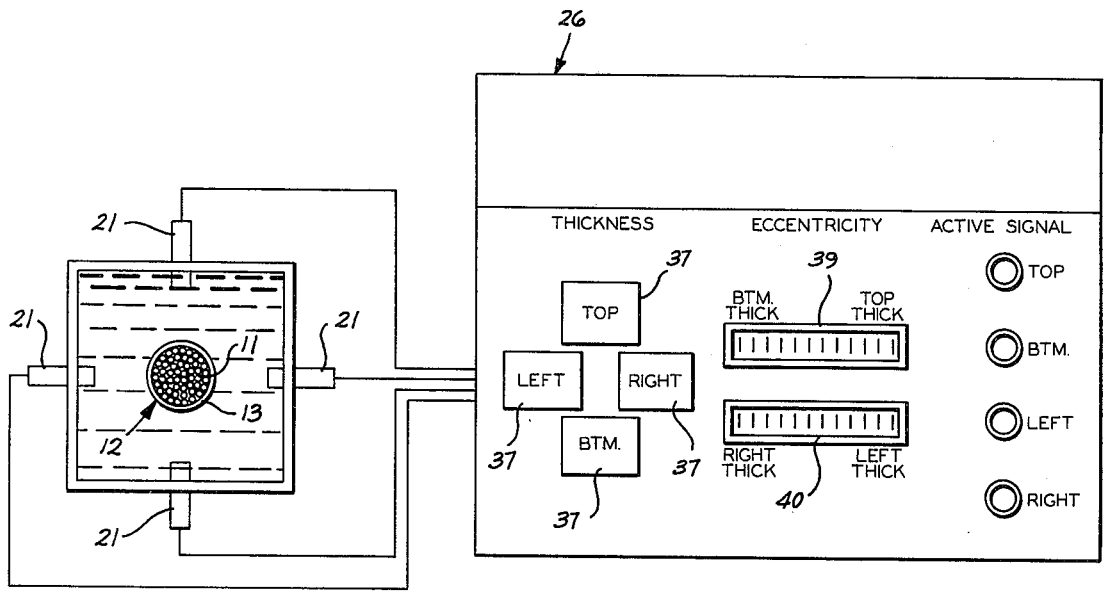
FIG. 2 is an enlarged view partially in section of a water trough shown in FIG. 1 and showing the positioning of four transducers in the form of crystals relative to the jacketed core being advanced through the trough and also showing a view in elevation of a console for displaying the measurement in analog fashion and for displaying eccentricity of the cable jacket.

Referring now to FIG. 1, there is shown an apparatus, designated generally by the numeral 10, for covering successive sections of a cable core 11 with a plastic material such as polyethylene to provide a cable 12 having a jacket (see FIG. 2). As can be seen in FIG. 1, the apparatus 10 includes an extruder, designated generally by the numeral 14, and a cooling trough 16 positioned just downstream of the extruder. Successive sections of the core 11 are advanced by a capstan 17 through the extruder 14 where the plastic material is extruded thereon. Then the successive sections of the cable 12 are advanced into and through the cooling trough 16 and taken up on a reel 18.

In order to most effectively control the thickness "$d$" of the jacket 13 (see FIG. 2) which is extruded over the core 11 and further to control the eccentricity of the jacket, an ultrasonic jacket measuring apparatus, designated generally by the numeral 20 (see FIGS. 1 and 2)) is positioned on the line 10. The apparatus 20 monitors the jacket thickness and eccentricity immediately as the successive sections of the jacketed core 11 are advanced into the water trough 14. The ultrasonic jacket thickness measuring apparatus 20 is designed to use the well-known pulse-echo measuring technique that requires at least one crystal 21 (see FIG. 2). As will be recalled from the discussion hereinbefore, the crystal 21 is to be excited to emit pulses directed toward the successive sections of the jacketed cable 12. The water of the cooling trough 16 serves as the coupling medium for transmitting ultrasonic energy to the cable jacket 13.

In order to conduct a meaningful monitoring of the thickness $d$ of the jacket 13, it becomes necessary to measure the jacket thickness at several points around the periphery thereof. This is also necessary in order to be able to determine the eccentricity of the cable jacket 13.

As can best be seen in FIG. 2, a plurality of crystals 21—21 are deployed about and spaced from the circumference of the jacketed cable 12 with each of the crystals being immersed in the cooling medium e.g., water, of the cooling trough 16. The crystals 21—21 must be selected to concentrate as much energy as possible in a small area, i.e., the crystal desirably has a line of focus, the line being transverse of the cable 12. Also, the selection must be made so that the crystal 21 may be used for all expected size cables in a manufacturing environment as well as for as many different materials as possible.

Another critical characteristic is the damping factor of the crystal 21. If the damping out is not fast enough, there will be no meaningful indication of the thickness of the jacket 13; that is, the pulse echoes (echo I and echo II of FIG. 6($a$)) merge and become indistinguishable.

Tests were conducted on several different types of crystals. A lead zirconate crystal was found to be more desirable since it produces a signal of greater magnitude for the same excitation as does a 10 MHz lithium sulfate crystal and with a better damping characteristic.

Tests were also conducted to determine the effects of crystal size and alignment on the output signal. Bends in the cable 12 cause angular misalignment between the cable and the crystal 21. This results in a variation in the receiver signal amplitude as the cable is advanced past the crystal 21 with complete loss of signal occurring occasionally. This is most prominent with the inner cable jackets, but is not expected to manifest itself often enough to affect appreciably the performance of the apparatus 20.

The smaller size crystals appear to work best for the large size cables 12. This is true since the smaller size crystal illuminates a smaller distance transversely across the cable 12, and the return more closely resembles that from a flat surface. Moreover, the larger size cable 12 generally has very little lateral motion near the extruder and hence does not move out of the field of the direct ultrasonic pulse.

When the sheath of the cable 12 is corrugated, a smaller crystal tends to spatially filter the return energy by sensing only the on-axis inner reflection. Conversely, a wider crystal tends to sense off-axis reflections from the corrugations which may tend to cancel or distort a portion of the inner surface echo. On a smaller pair size cable 12, especially those having a smooth metal sheath, a wider crystal permits greater lateral motion of the cable near the extruder and produces consistent first and second echo signals.

The crystals 21—21 are excited by a voltage impulse which causes cyclical mechanical stresses. These stresses generate high frequency pressure gradients or waves in the coupling medium, which in this case is the water of the cooling trough 16. The waves, varying in intensity as a damped sinusoid, propagate to the surface of the cable jacket 13 (in time T, see FIG. 6($a$)) where a portion thereof is reflected due to the acoustical impedance mismatch. This causes an outer surface echo (echo I, see FIG. 6($a$)) to be generated.

A portion of the pressure wave also travels inwardly into the cable jacket 13 with a second reflection occurring at the inwardly facing surface of the cable jacket. This determines the second, or inner surface, echo (see echo II, FIG. 6($a$)).

Tests have showed that the wider crystals, i.e., along a line measured transverse of the cable axis, tended to be less sensitive, i.e., produced lower amplitude echoes, than the more narrow units. Also, the wider crystals 21—21 tend to "ring" for a longer duration. This is somewhat disadvantageous when measuring thin jackets. However, by using a higher frequency crystal 21, the ringing time can be shortened. It has been found that because of greater polyethylene attenuation at higher frequencies, the crystal frequencies cannot be increased without limit.

Figure 6:
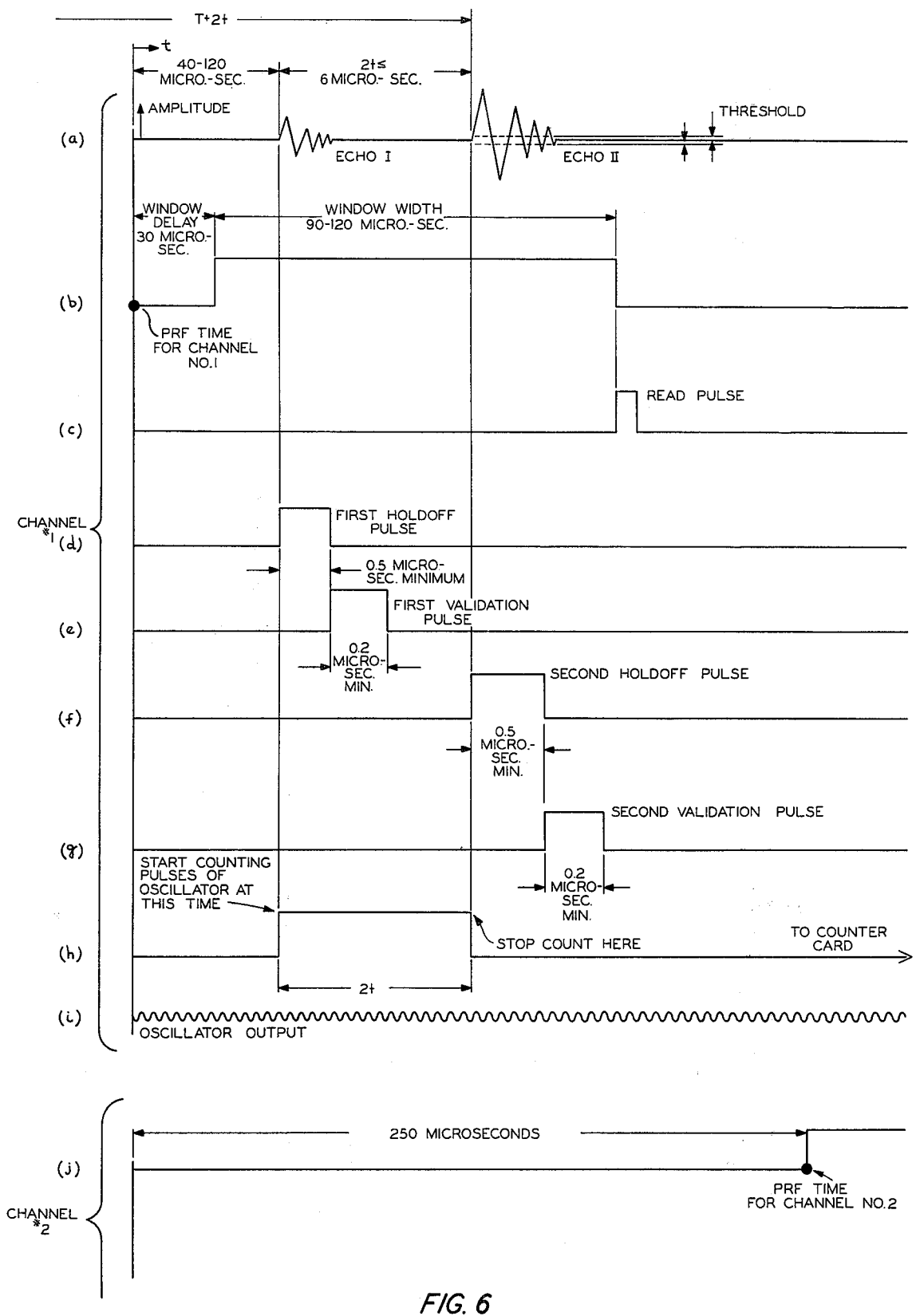
FIG. 6 is a graph showing wave forms associated with the operation of the units of the apparatus shown in FIG. 2 and having appropriate legends for indicating the various curves thereof.

It will be recalled that the measurement technique involved is to determine the time separation ($2t$, see FIG. 6 ($a$)) between echo signals. This separation relates directly to the thickness $d$ of the cable jacket 13. The thickness data depends on the uniformity of the sound velocity in polyethylene. Experiments have shown that this velocity is substantially uniform, hence permitting the use of the equation $2d = vt$ where $d =$ polythickness, $v =$ sound velocity, and $t =$ echo separation time. The echo separation time is measured, and knowing $v$ (about 20 mils per microsecond), $d$ is readily determined. There may be some nonuniformity in the propagation velocity at the surface of the polyethylene which cools before the interior of the jacket 13.

Figure 3:
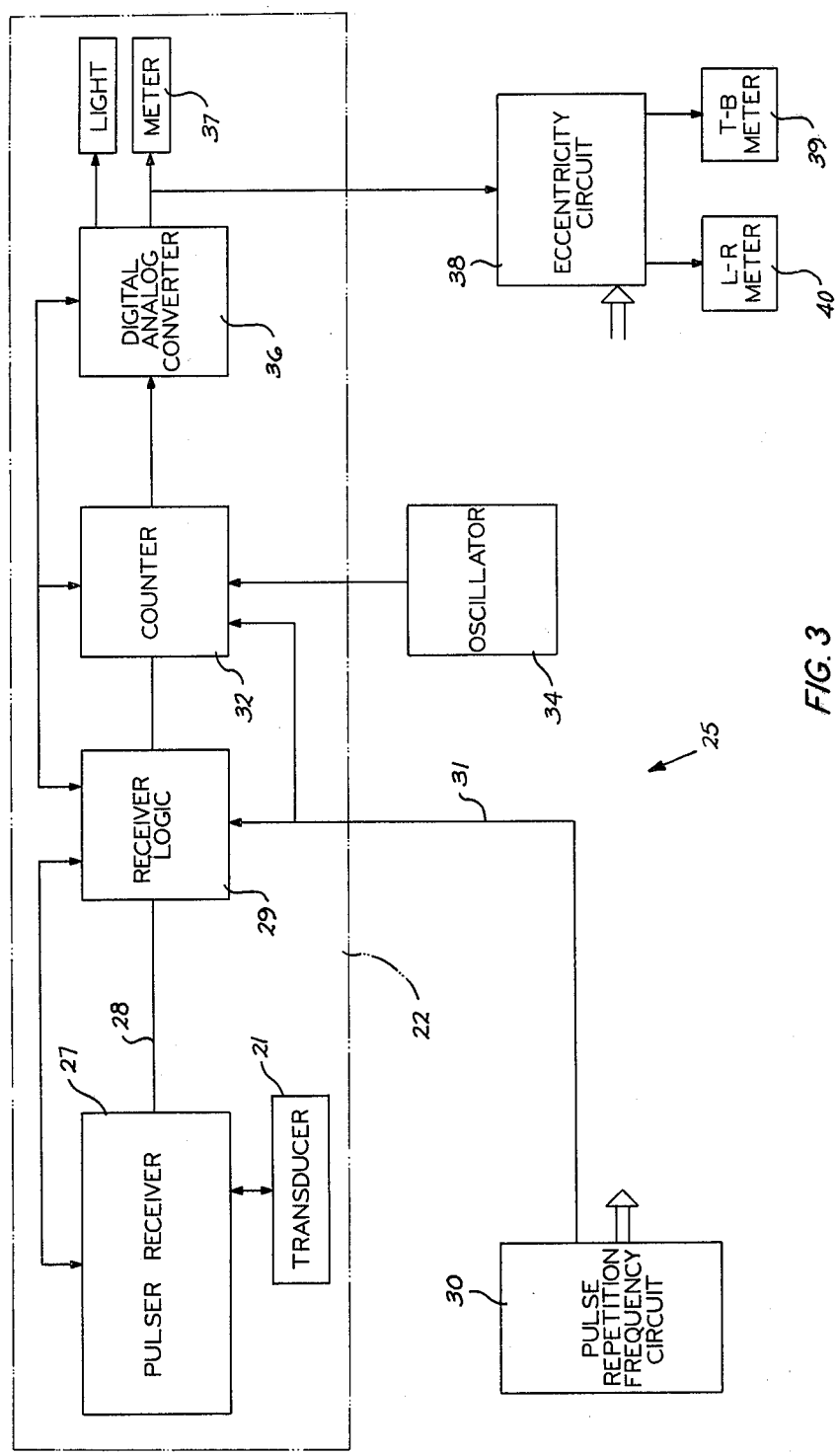
FIG. 3 is an overall view in schematic showing a typical one of four channels used to perform the ultrasonic measurements and showing components which are common to all four channels.

Each of the crystals 21—21 is connected electrically to an associated one of a plurality of channels 22—22 (see FIG. 3). Each of the channels 22—22 include a plurality of elements to be described hereinafter for converting the time interval between the pulse echoes received from the various interfaces of the materials aligned with the associated crystal 21 to an output which is proportional to the thickness of the cable jacket 13.

Additionally, other elements are provided, which together with the four channels 22—22 comprise an electrical circuit, designated generally by the numeral 25. The output of the circuit 25 in terms of thickness and eccentricity is displayed for an operator on a console 26 (see FIG. 2).

Referring now to FIG. 3, there is shown a typical one of the channels 22—22 together with other elements which are common to the four channels. Each of the channels 22—22 includes the associated one of the crystals 21—21 which is connected electrically to an associated pulser receiver, designated generally by the numeral 27. The pulser receiver 27 is a specially designed device which is used in each cycle initially to transmit a pulse to the associated one of the crystals 21—21 to cause the associated crystal to ring at the natural frequency thereof. Subsequently, in each one of the cycles, the pulser receiver 27 functions to receive pulse echoes from the cable 12 under test.

The pulser receiver 27 is connected electrically along a line 28 to a receiver logic circuit, designated generally by the numeral 29, which upon command from a pulse repetition frequency circuit (PRF) 30, causes the pulser receiver 27 to pulse the associated transducer crystal 21. As can be seen in FIG. 3, the pulse repetition frequency circuit 30 is connected along a line 31 to the receiver logic circuit 29. The receiver logic circuit 29 is designed to validate echo pulses received from the cable 12 under test and is capable of discarding those pulses not pertinent to the measurement of the thickness of the jacket 13. As such, the receiver logic circuit 29 must have the inherent intelligence to discriminate between noise spikes and valid signals as well as to differentiate as between the first and second echo signals.

The receiver logic circuit 29 is connected electrically to a counter, designated generally by the numeral 32, which includes a plurality of decade counters (not shown). The counter 32 is designed to measure the width of the output pulse from the receiver logic circuit 29. The counter 32 is pulsed by a commercially available oscillator, designated generally by the numeral 34, (see oscillator output, FIG. 6($i$)) and is designed to store the pulse count in a buffer or memory bank (not shown) provided that the pulses received by the pulser receiver 27 are validated by the receiver logic circuit 29.

Subsequently, the stored digital count from the counter 32 is transferred to a digital-to-analog converter, designated generally by the numeral 36, which converts the digital count to an analog voltage. The function of the digital-to-analog converter 36 is to provide an analog voltage corresponding to the digital count stored in the counter 32. This voltage is an indication of thickness for the associated channel. The continuous analog voltage, appropriately scaled, is displayed on a meter 37 (see FIG. 2) associated with that channel 22. This permits an operator to monitor continuously the thickness $d$ of the cable jacket 13 at a portion of the periphery associated with the one channel.

In the alternative, the counter output stored in the buffer may be connected to a commercially available general purpose digital computer (not shown) so that data analysis and reduction may be accomplished.

In order to and the eccentricity of the cable jacket 13, an eccentricity measuring circuit (not shown) is connected to the digital-to-analog converter 36 of each one of the channels 22—22. The eccentricity measuring circuit is designed to compare the jacket thickness $d$ at the top nominal jacket bottom of the cable jacket 13 as viewed in FIG. 2, and the jacket thickness at the left and right hand sides thereof. Of course, the comparative measurements need not be taken along horizontal and vertical axes but rather only at opposing intersections of the axes of a coordinate system with the cable jacket 13.

The eccentricity measuring circuit is designed to subtract the thickness of the bottom measurement from the measurement at the top of the jacket 13, as viewed in FIG. 2, with the result being multiplied by 100 and divided by the nominal jacket thickness to yield a per cent of nominal jacket thickness. A similar computation is made with respect to the thicknesses at the left and right hand portions of the cable jacket 13. Each of these measurements is displayed on a top-bottom meter 39 and a left-right meter 40 associated with the eccentricity measuring circuit.

Figure 5:
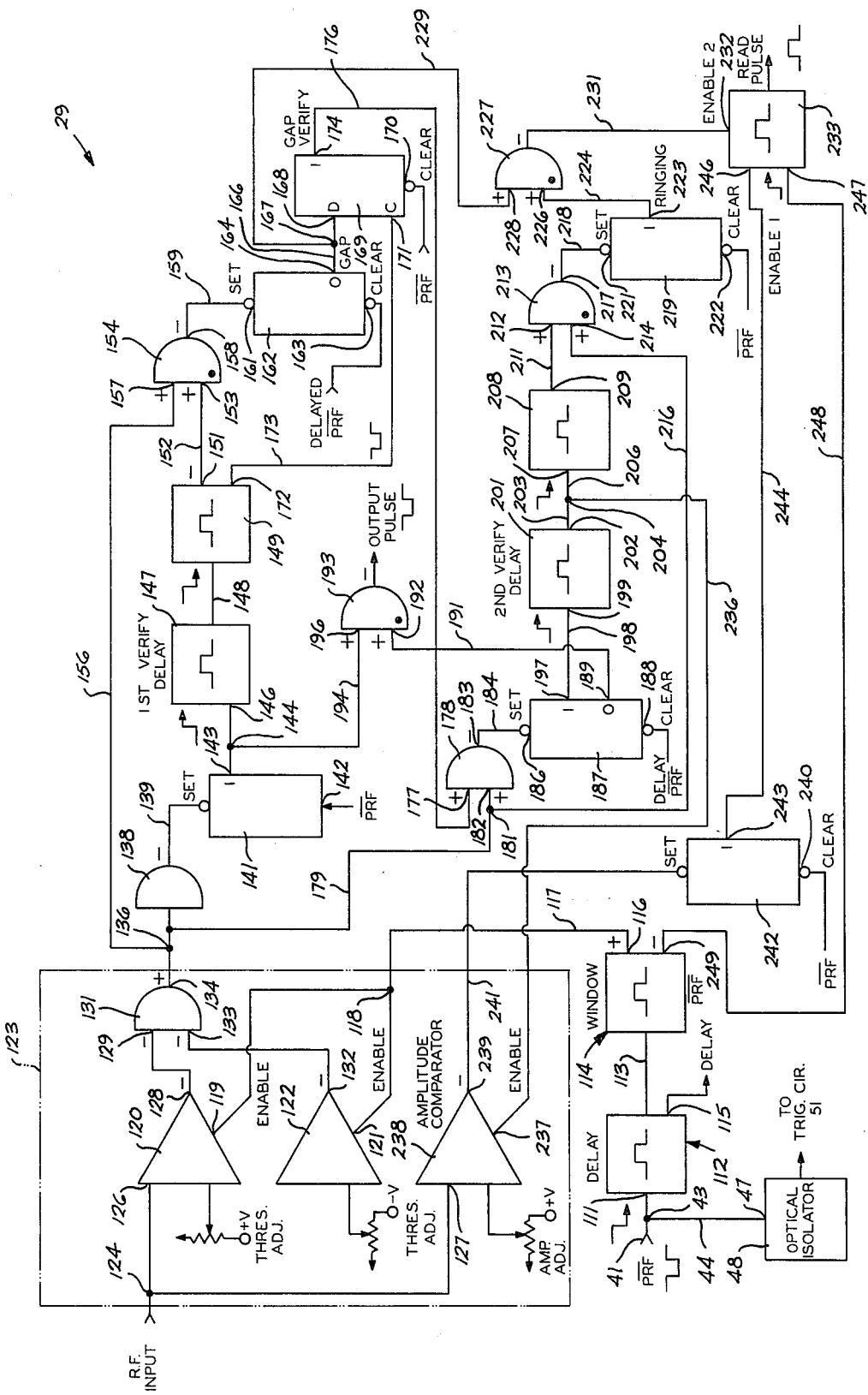
FIG. 5 is a detail schematic view of a receiver-logic circuit shown in FIG. 2 for discriminating among spurious signals and meaningful measurement signals to control the generation of a read pulse for validating a time interval indicative of the jacket thickness.

The pulse repetition frequency circuit 30 is designed to apply a signal, a negative going square pulse (⊔) at a time referred to as the PRF time over the line 31 to a junction point 43 (see FIG. 5) for example the first channel and from there along a line 44 to an input 47 of a pulsing device 48 (see FIG. 5). The pulsing device 48 applies a pulse to the pulse-receiver 27 (see FIG. 3) to control the pulser-receiver to cause the associated transducer 21 to emit pressure waves.

Description of the Pulser-Receiver

The pulser-receiver 27 embodies principles of the invention disclosed and claimed in copending application Ser. No. 268,961, filed on even date herewith in the names of L. M. Boggs, H. J. Flichman and J. A. Hudson, Jr., now Pat. No. 3,827,287.

The pulser-receiver 27 includes a triggering circuit 51 to which is applied the pulse from the pulsing device 48 for causing the application of a high current pulse to a control electrode 53 of a first silicon controlled rectifier (SCR) 54 to cause the first SCR to fire.

The silicon controlled rectifier 54 is a commercially available device and may be a two-state semiconductor device having thyratron-like operating characteristics. The silicon-controlled rectifier 54, which is normally in a non-conductive state, includes a cathode 58 and an anode 57, the latter of which is biased in a forward direction by suitable external means such as a positive voltage source 58. The control electrode 53 is effective, when suitably energized by a biasing potential, to place the silicon-controlled rectifier 54 in a conductive state.

Figure 4:
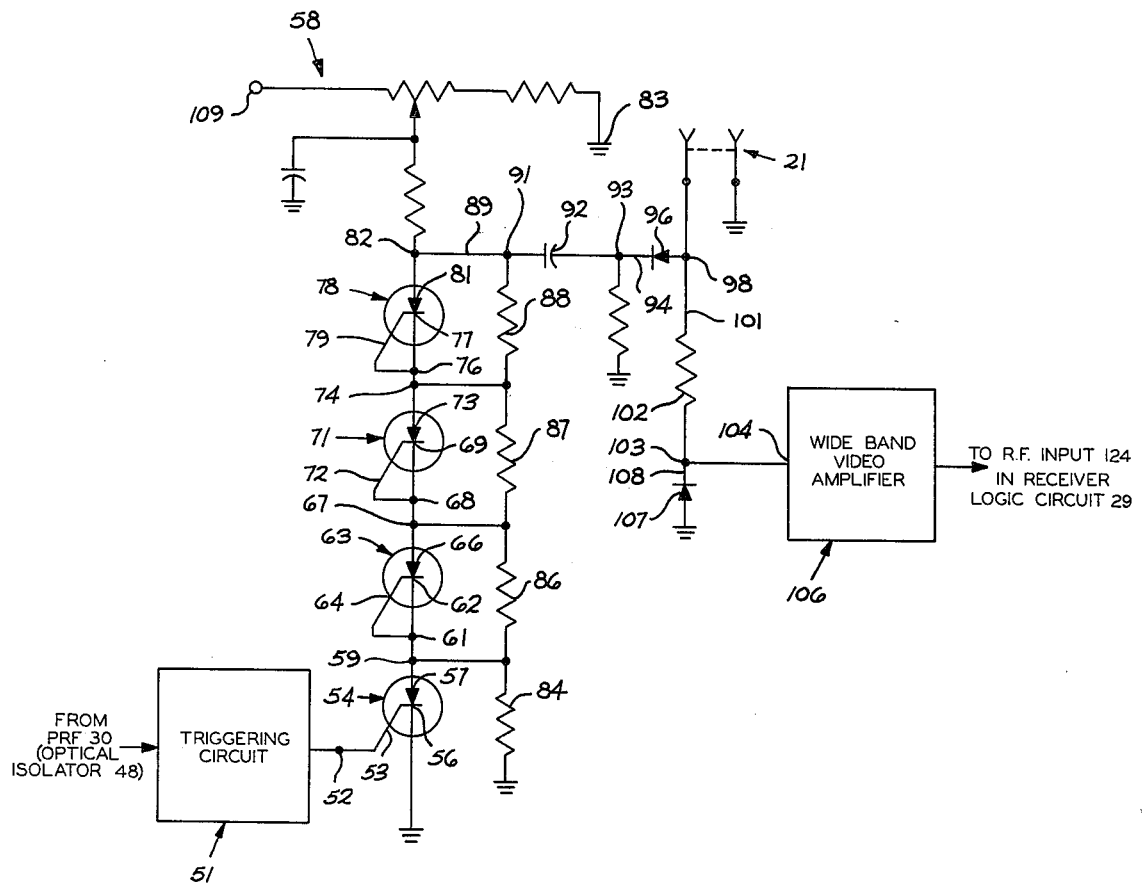
FIG. 4 is a detail schematic view of a pulser-receiver unit shown in FIG. 2 for exciting one of the transducers to emit pulses to the cable and for amplifying returning pulses.

As can be seen in FIG. 4, the anode 57 of the first silicon controlled rectifier 54 is connected serially through a junction point 59 and through a junction point 61 to a cathode 62 of a second silicon-controlled rectifier 63. The junction point 61 is connected to a gate 64 of the second SCR 63. An anode 66 of the SCR 63 is connected through junction points 67 and 68 to a cathode 69 of an SCR 71. The junction point 68 is connected to a control electrode 72 of the SCR 71. Finally, an anode 73 of the SCR 71 is connected through junction points 74 and 76 to a cathode 77 of an SCR 78, the junction point 76 being connected to a gate 79 of the SCR 78.

As can still be seen in FIG. 4, an anode 81 of the SCR 78 is connected through a junction point 82 to ground 83. The silicon-controlled rectifiers 54, 63, 71 and 78 have resistors 84, 86, 87 and 88, respectively, associated therewith and connected thereacross. The junction point 82 is connected along a line 89 through a junction point 91 to which is connected the series of the resistors 84 and 86–88, and then through a capacitor 92 to a junction point 93. The junction point 93 is connected to a cathode 94 of a diode 96, an anode of which is connected through a junction point 98 to the associated one of the transducers 21—21. The diode 96 is effective to block out spurious noise signals, which are of low amplitude. If the diode 96 were not present, noise signals of low amplitude from the firing portion of the circuit would tend to move through the junction point 93 to the junction point 98 and tend to degrade echo signals from the associated transducer 21. In response to these low level noise signals, the diode 96 acts as an open circuit for either positive or negative excursions.

The blocking diode 96 is also connected through the junction point 98 along a line 101 through a resistor 102 to a junction point 103 and thence to an input 104 of a wide band video amplifier 106. In order to avoid the appearance of a large negative voltage at the input 104 of the amplifier 106 which would be damaging thereto, a diode 107 is inserted into a line 108 connecting with the junction point 103.

The wide-band, low noise, video amplifier 106, which is available commercially, receives, amplifies and then transmits return echo signals from the cable 12. The low level current return signals must be amplified to approximately a 1 to 3 volt level. The wide-band video amplifier 106 is selected so that the semiconductor devices used therein have low noise properties. In this way, the signals received and amplified for transmittal to the receiver logic circuit 29 will be stronger than the signals caused by noise and hence will permit accurate detection of the meaningful signals.

The provision of facilities in the pulser-receiver circuit 27 for reducing the noise level during a time period when echo pulses are accepted by the circuit 25 for testing is especially important when using the apparatus 20 to measure the thickness of an inner jacket. The pulse echoes received from the inner jacket are lower in amplitude than those received from an outer jacket. This is caused by the polyethylene surface being more irregular on the inner jackets. The slight peaks and valleys of the inner jacket reduce the target area of the cable, and, thus, cause less leading edge amplitude of the echo signals. Also, the slight peaks and valleys cause phase differences in portions of the electrical echo signals, which may add out-of-phase giving lower amplitudes. Although echo signal strength does vary between inner and outer jackets and between sizes of cable, a fixed gain system can be employed for all types of polyethylene cable.

The inner jacket shrinks about the cable core 11 and presents a somewhat irregular outwardly facing surface. In contrast, the outer jacket is extruded over a tubular metal shield which assists in causing the outwardly facing surface of the outer jacket to be rather uniform. This necessitates setting for a lower threshold pickup, again increasing chances for pickup of noise signals.

The diode 96 interposed between the pulse generator portion of the circuit which includes the silicon-controlled rectifiers 54, 63, 71 and 78 and the wide-band video amplifier 106 of the pulser-receiver 27 functions to raise the impedance level during the time in which the receiver 27 is "listening" for echoes. This permits better operation of the wide-band video amplifier from the standpoint of the effect of noise on the operation of the apparatus 20.

The diode 96 is positioned in the line 89 connecting the pulse generator or pulse shaping portion of the circuit 27 to the wide-band video amplifier 106 so that in a first direction, the circuit appears as an open. In the other direction, to the left, as viewed in FIG. 4, the diode 96 permits passage of a negative current pulsing the associated one of the transducers 21—21.

General Description of System Logic

The detection system is tailored to the characteristics of the expected signals. For example, because of the known distance between the transducer 21 and the cable 12 together with the velocity of propagation of sound waves in a water medium, the time interval during which pulse echo signals may be expected is generally known. Therefore, the ultrasonic apparatus 20 is designed to accept pulse echo signals during this time interval only, which is referred to hereinafter as the "window width".

Two sound properties of polyethylene, propagation velocity and acoustical impedance, are particularly important. Both are dependent on the polyethylene temperature, and, therefore, required extensive on-line investigation.

The equation for the velocity of the longitudinal sound wave (shear wave not being important here) in a medium is given as:

$$V_l^2 = \frac{Kc + \frac{4\mu}{3}}{\rho}$$

Where
$Vl$ = longitudinal velocity
$\mu$ = shear modulus
$\rho$ = density
$Kc$ = Modulus of volume elasticity Values for the variables in the above equation did not appear to be available heretofore, especially at the higher polyethylene temperatures. The literature merely forecasts variation with temperature. Since this velocity "constant" would bear directly on the accuracy of thickness measurements, an emperical investigation was conducted.

Ultrasonic thickness signals were recorded on several sheathing lines at 1 and 2-foot intervals along the cooling trough 16. The recordings indicated a two-to-one change in propagation velocity for polyethylene from hot to cold conditions. The shape of a curve of echo separation plotted against distance from the extruder varies with cable type, line speed and water temperature. However, for a given polyethylene thickness, the echo separation measured close to the extruder is relatively constant, independent of cable size, water temperature and line speed. Thus, by locating the crystals 21—21 close to the extruder, one of the desired characteristics of the new system could be achieved, and at the same time effect a more consistent operation of the ultrasonic technique.

The acoustical impedance of polyethylene is important because it affects the magnitude of the echo signals. The equation for acoustical impedance is as follows:

$$Z = \rho V_l$$

with symbols as previously discussed. The amount of reflection at the interface between two media increases as the differences in acoustical impedances increase. This degree of impedance mismatch determines the echo amplitudes. The water and polyethylene interface determines the first echo and polyethylene and air, steel, aluminum or flooding compound interface determines the second.

Experimental data showed that acoustical impedance for polyethylene decreased for higher temperatures. In particular, the first echo was much lower in amplitude than the second echo due to the greater acoustical mismatch at the second polyethylene surface. Also, the second echo signal had a much longer duration than the first echo signal. These signal characteristics are used to advantage in the design of the "intelligence" of the receiver logic circuit 29. On inner jacket measurements, where signal amplitudes would vary considerably due to surface irregularities, this intelligence is particularly beneficial. If echo amplitude or duration, momentarily drops below minimums, an incorrect measurement is not made. Instead, the last previous good measurement is retained in a register buffering the counter 32 to maintain a correct thickness output.

Description of Receiver Logic Circuit

The receiver logic circuit 29 to be described hereinafter embodies principles of the invention disclosed and claimed in copending application Ser. No. 268,961, filed on even date herewith on July 5, 1972 in the names of L. M. Boggs-H. J. Flichman-J. A. Hudson, Jr. now Pat. No. 3,827,287.

The receiver logic circuit 29 is designed to check the following expected signal characteristics: (1) the signal echoes occur in a predetermined time span (referred to as the window width) after the transmitted pulse, (2) the initial polarity of either echo is indeterminate, (3) the first echo pulse is short in time duration compared to the second echo (see FIG. 6(a)), (4) a time interval of at least 200 nanoseconds exists between the first and second echo, (5) the amplitude of the second echo pulse is greater than the minimum required of the first echo (see FIG. 6(a)), and (6) the second echo pulse has a time duration of at least 0.700 microsecond. If these characteristics are met for a particular sequence of associated first and second echo pulses, the receiver logic circuit 29 issues a command in the form of a read pulse to the counter 32 to store the count recorded during the time $2t$ (see FIG. 6(h)) as valid data.

The junction point 43 is connected to an input 111 of a monostable one-shot multivibrator 112 (see FIG. 5), which generates a delay pulse applied along a line 113 to a second monostable, one-shot multivibrator 114 and from an output 115. One output 116 of the multivibrator 114 is connected along a line 117 through a junction point 118 to an input 119 of a positive voltage threshold detector or comparator 120 and an input 121 of a negative voltage comparator 122.

The threshold detectors 120 and 122 are included in a comparator portion 123 of the receiver logic circuit 29. As is seen in FIG. 5, the comparator portion 123 of the circuit 28 includes an RF terminal input 124 which is connected to the wide band video amplifier 106. The input 124 is applied to inputs 126 and 127 of the threshold detectors 120 and 122, respectively.

The detectors 120 and 122 have a negative true output when the thresholds thereof are exceeded. As can be seen in FIG. 5, an output 128 of the threshold detector 120 is applied as an input 129 of a NOR gate 131 having negative logic. This nomenclature is interpreted to mean that should either the input 129 or another input 133 have a negative or low level applied thereto, an output 134 of the NOR gate 131 will be a positive or high level. An output 132 of the detector 122 is applied to the other input 133 of the NOR gate 131. The output 134 of the NOR gate 131 is applied through junction points 136 and 137 to an inverter 138 which changes the polarity of the input signal and then along a line 139 to a flip-flop 141 to set the flip-flop.

The flip-flop 141 has a clear or reset input 142 connected to the pulse repetition frequency circuit 30 and has one output 143 thereof connected through a junction point 144 to an input 146 of a hold-off pulse generator, designated generally by the numeral 147. The hold-off pulse generator 147, which is a monostable, one-shot multivibrator, is connected through a line 148 to a validation pulse generator, designated generally by the numeral 149. The validation pulse generator 149 is also a monostable, one-shot multivibrator.

An output 151 of the multivibrator 149 is connected along a line 152 to an input 153 of a positive true NAND gate 154. Also, as can be seen in FIG. 5, the junction point 136 is connected along a line 156 to the other input 157 of the NAND gate 154. Should positive signals be applied simultaneously to the inputs 153 and 157 of the NAND gate 154, a negative or low level appears at an output 158 thereof.

The output 158 of the NAND gate 154 is connected along a line 159 to a set input 161 of a flip-flop 162. The flip-flop 162 is reset by a delayed $\overline{PRF}$ signal. This is caused by the application of a reset signal to an input 163 of the flip-flop by the trailing edge of the delay pulse from the output 115 of the multivibrator 112.

Still referring to FIG. 5, an output 164 of the flip-flop 162 is connected along a line 166 through a junction point 167 to an input 168, referred to as the "D" input, of a flip-flop 169. A clock input, referred to as a "C" input, 171 of the flip-flop 169, is applied from an output 172 of the multivibrator 149 along a line 173.

The flip-flop 169 which is cleared by a pulse repetition frequency signal ($\overline{PRF}$) applied at an input 170 produces a signal at an output 174 and transmitted along a line 176 to one input 177 of a positive true NAND gate 178. The junction point 137 is connected along a line 179 through a junction point 181 to a second input 182 of the NAND gate 178. An output 183 of the NAND gate 178 is connected along a line 184 to an input 186 of a flip-flop 187.

The flip-flop 187 has a reset input 188 from the pulse repetition frequency circuit 30 but which is delayed to the trailing edge of the pulse generated by the multivibrator 112. One output 189 of the flip-flop 183 is connected along a line 191 to an intput 192 of a positive true NAND gate 193. Also, the junction point 144 is connected along a line 194 to the other input 196 of the NAND gate 193, the NAND gate producing a negative or low output pulse as shown in FIG. 5.

Another output 197 of the flip-flop 187 is connected along a line 198 to an input 199 of a monostable, one-shot multivibrator 201. The multivibrator 201 functions as a generator of a hold-off pulse for testing the characteristics of the second pulse echo. An output 202 thereof is connected along a line 203 through a junction point 204 and a line 206 to an input 207 of a second echo validation pulse generator designated generally by the numeral 208. The generator 208 is also a monostable, one-shot multivibrator.

An output 209 of the multivibrator 208 is connected along a line 211 to an input 212 of a positive true NAND gate 213 with another input 214 of the NAND gate connected back along a line 216 to the junction point 181. The NAND gate 213 is adapted to produce a negative signal at an output 217 and then along a line 218 to set a flip-flop 219 through an input 221 thereof.

The flip-flop 219 is a so-called ringing flip-flop and has a reset input 222 from the pulse repetition frequency circuit 30. Moreover, the flip-flop 219 is adapted to producce a signal at an output 223, then along a line 224 to an input 226 of a positive true NAND gate 227. The NAND gate 227 is adapted upon application of positive or high signals at both of the inputs 226 and an input 228 connected along a line 229 to the junction point 167 to produce a negative or low along a line 231 to an input 232 of a pulse generator in the form of a monostable, one-shot multivibrator 233 to enable the multivibrator.

The junction point 204 is connected along a line 236 to an input 237 of an amplitude comparator 238 of the detector circuit 123. An output 239 of the comparator 238 is connected along a line 241 to a flip-flop 242. The flip-flop 242 also has a reset input 240 from the pulse repetition frequency sequencer 30. An output 243 from the flip-flop 242 is connected along a line 244 to an input 246 of the multivibrator 233. The multivibrator 233 has another input 247 thereof connected along a line 248 back to an output 249 of the multivibrator 114.

The multivibrator 233 is adapted to generate a read pulse which causes the count to be stored in the memory bank (not shown).

It is important to note that there be approximately 1½ to 3 inches of water above the top of the cable 12 in order that the apparatus 20 function properly. Also, a bottom portion of each of the crystal transducers 21—21 must be submerged. There may be some difficulty in meeting this requirement in existing equipment.

Resort may be had to a cylindrically shaped device which may be placed over the topmost one of the transducers and in proximate engagement with the cable 12. Then a vacuum may be applied to the container to draw water up therewithin to submerge the bottom portion of the enclosed crystal.

It should be realized that the term "measure" or "test" or "monitor" as used herein is interpreted to mean the comparison of a quantity to a reference quantity. For example, the threshold detectors 120 and 122 check to determine if the echo pulses are at least of the threshold amplitude. On the other hand, the comparator 238 determines whether the peak amplitude of the second echo pulse is greater than a predetermined magnitude. Of course, the apparatus 20 could be sophisticated so that the actual values of the time durations and the amplitudes could be determined.

Depending on the error rate which may be tolerated in the monitoring process, the apparatus 20 could be less sophisticated and still fall within the scope of this invention. For example, the channel 22 may be designed to check automatically thresholds of both pulses, peak amplitude of the second echo pulse with the testing of any second pulse recorded being permitted after a preset time. This, of course, assumes that the first echo pulse having the required threshold is a valid pulse, which may or may not be true. In the alternative, the apparatus 20 may be designed to determine if the thresholds of both pulses are above a predetermined magnitude, if the peak amplitude of the second echo pulse is greater than a predetermined value, and if the duration of the first echo pulse is less than a preset value.

The preferred embodiment described herein records a time count between the echo pulses if a sequence of first and second echo pulses are validated. The first pulse is validated if the amplitude is above a certain threshold and the duration less than a preset value. The second pulse is validated if the peak amplitude thereof is in excess of a preset magnitude and the duration greater than a preset duration. A valid sequence of a first and a second echo must occur on the so-called window width.

The present invention also contemplates that not only may the actual values of pulse amplitude and duration be determined, but also the frequency content of the echo pulses for comparison to those associated with particular material of the jacket under test.

The sophistication of the present system is required because of the intended use thereof to measure dynamically cable jacket thickness while the cable 12 is being advanced. The, unlike in the measurement of tubing wall thickness, the measuring process must take into account the lateral motion of the cable and deformations in the jacket 13. In some prior art apparatus, manual adjustments must be made when cable sizes or other parameters are changed. Apparatus embodying the principles of this invention automatically adjusts to these changes.

The term "facing" as employed in the specification and claims appended thereto when referring to the relationship between a surface and an object will be understood to means that the surface is oriented in the direction of the object and may be, but is not necessarily, adjacent to or in contact with the object.

All of the logic elements, i.e., the NAND gates and the NOR gate, the bistable elements, i.e., the flip-flops and the monostable elements, i.e., the one-shot multivibrators are described in operation in terms of positive logic where a high or positive level voltage respresents or exhibits a binary "1" and a low or zero level voltage represents a "0". Also, generally throughout the method of generation, the inputs and outputs of the various elements are described in terms of high or low levels. It is understood that this is to be interpreted in accordance with the description hereinbefore.

A positive true NAND gate produces a low level output voltage only when a high level input is present on all inputs thereof. The output is a high level for any other combination of inputs.

A negative true NOR gate produces a high level output when there is a low level present on any input. Only when there is no input of a low level is there a low level output.

A flip-flop refers to a bistable multivibrator or similar circuit or device having two stable states. The flip-flop may have a plurality of inputs for being switched from one state to the other state with the application of an input thereto. Additionally, the flip-flop conventionally has two outputs, only one of which need be used. A high level or 1 output produces a a low output voltage level, and a 0 output produces a high output voltage level when the flip-flop is in a first reset or clear state. The output voltage levels are reversed when the flip-flop is set to a second state.

A one-shot multivibrator refers to a monostable multivibrator or simiilar circuit or device which upon the application of a 1 to the input thereof, the input going from 0 to 1 or low to high, produces a single output pulse of 1 level having a selected duration. A delay one-shot refers to a multivibrator such that an output pulse of 1 level and of selected duration is produced a predetermined duration of delay after a 1 is applied to the input thereof.

An inverter refers to a device which produces a 0 output when a 1 is applied to the input thereof, and conversely, which produces a 1 output when a 0 is applied to the input thereof.

It should be observed that the application of the $\overline{PRF}$ signal to the rset or clear inputs of any of the conventional flip-flops resets the flip-flops. The resetting of the flip-flops causes the output terminals thereof which previously exhibited a high level to then exhibit a low level. The resetting likewise causes previously low level inputs to go high.

Method of Operation of Pulser

In describing the method of operation of the ultrasonic measuring apparatus 20 in accordance with the principles of this invention, reference will be made to FIGS. 4 and 5. The pulse repetition frequency circuit 30 applies a pulse along the line 41 to the junction point 43 and then along the line 44 to the pulsing device 48. Then, the optical isolator 48 applies a triggering pulse to the triggering circuit 51.

The triggering circuit 51 applies a positive potential to the control electrode 53 to cause the firing of the first silicon controlled rectifier 54 which applies an excessive anode to cathode potential to cause the second SCR 63 to fire. Similarly, the SCR's 71 and 78 are fired.

The four silicon controlled rectifiers 54, 63, 71 and 78 are capable of withstanding the applied potential as evenly divided by the resistors 84 and 86–88. However, when the first silicon controlled rectifier 54 is rendered conductive, the remaining three cannot withstand the applied potential and breakdown as hereinbefore described.

This successive firing of the four serially connected silicon controlled rectifiers 54, 63, 71 and 78 causes the capacitor 92 to discharge to apply a voltage pulse to the associated transducer 21. The pulse applied to the transducer 21 is a negative pulse of 200–250 volts in magnitude and of approximately 60 nanoseconds in duration and is applied through the diode 96 along the line 98 to ground. The application of this pulse to the transducer 21 causes the transducer to generate pressure waves which engage with the sections of the aligned jacketed cable 12.

An instant after the silicon controlled rectifiers 54, 63, 71 and 78 fire, the potential at the junction point 91 is low, substantially zero, while that at the junction point 93 is approximately 200–250 volts. This causes the capacitor 92 to discharge. The capacitor 92 is chosen so as not to discharge instantaneously. Rather, the capacitor 92 discharges over a period of time from the diode 107 through the junction point 98 and the diode 96. Also, the capacitor discharges through the silicon controlled rectifiers until there is substantially zero potential across the capacitor.

Then current is drawn from the source 109 to recharge the capacitor 92 to the original state thereof. Current in the silicon-controlled rectifiers is applied from the SCR 78 in the direction toward the SCR 54. Moreover, the current drops from the several amps peak current to below that level whereupon the silicon controlled rectifiers become non-conducting. It should be observed that this occurs after the trigger pulse has passed and before the occurrence of the next succeeding trigger pulse.

General Overall Description of Operation of Receiver Logic Circuit

The receiver logic circuit 29 is designed to yield a positive pulse should the echo pulses received by the pulser receiver 27 be within a predetermined amplitude range. The receiver logic circuit 29 includes logic circuitry for making outside and inside band determinations for the echo pulses. Should the amplitude of the echo pulses received by the pulser receiver 27 be in excess of a predetermined amplitude, the circuit will register a negative or outside band pulse.

A valid set of echo pulses received by the pulser receiver 27 are spaced a time 2t apart as shown in FIG. 6 with the first echo pulse designated I, occurring approximately 40–120 microseconds after the initiation of the cycle. The first echo pulse occurs when the pulse emitted by the associated ringing transducer crystal 21 engages the outwardly facing surface of the jacket 13. The second echo pulse, designated II, occurs when the unreflected portion of the pulse emitted by the transducer crystal strikes the inwardly facing surface of the jacket 13.

The amplitude of echo pulse I is a function of the acoustical impedance mismatch between the hot polyethylene jacket and the water in the cooling trough 14. The amplitude of the echo pulse II is a function of the acoustical impedance mismatch between the hot polyethylene jacket and the core 11. Moreover, the first echo pulse is lower in amplitude and duration than the second echo pulse.

During the "window-width" (of approximate 90–120 microsecond duration, see FIG. 6(b)), a hold-off pulse (see FIG. 6(d)) is generated by the receiver logic circuit 29 upon receiving a first echo with a validation pulse (see FIG. 6(e)) beginning immediately after the first hold-off pulse ends. It is desirable that the first validation pulse occur after the amplitude decay of the first echo pulse. If the receiver logic circuit 29 indicates a positive output 158, then it is known that a valid first pulse has occurred. Thereafter, at the beginning of the second echo pulse, a second hold-off pulse is generated with a second validation pulse beginning at the conclusion of the second hold-off pulse. The second validation pulse should occur, unlike the first validation pulse, during the decay of the second echo pulse. Consequently, the portion of the circuit associated with the second validation pulse should give a negative output 217 which indicates that the second echo pulse is outside of the predetermined limits of the threshold band.

It should be observed that if the receiver logic circuit 29 receives a negative output from an apparent first echo, the receiver logic circuit does not look for a second echo and hence does not generate a read pulse for the first cycle.

The validation pulse also avoids the false pickup of noise signals which may be due to air bubbles in the water medium of the cooling trough 16. If a noise signal precedes the first echo pulse, the circuit picks up the noise signal as a first echo and subsequently attempts to validate the true first echo as an apparent second echo. Should this occur, the receiver logic circuit 29, not receiving the expected positive-negative sequence durations at output 158 and 217, respectively, does not cause the read pulse to be generated.

Additionally, the pulse repetition frequency circuit 30 controls the operation of the channels 22—22 and the interaction thereof. In order to accomplish this, the pulse repetition frequency circuit 30 generates four pulse repetition rate signals, one for each of the channels 22—22, each with approximately a one millisecond period. The four pulses are staggered by approximately 250 microseconds (see FIG. 6(j)), thereby causing the staggering of the operating sequence of the four channels. In this way, and starting with the top channel 22, proceeding then to the bottom, then left and right channels, all of the activity of significance in the top channel occurs within the first 250 microseconds prior to the generation of the shifted pulse associated with the bottom channel.

The PRF circuit 30 conditions the circuit 29 for each cycle. A $\overline{PRF}$ pulse defined as a negative true pulse from the PRF circuit is applied to the high level or 1 inputs 142, 170, 222 and 240 of the flip-flops 141, 169, 219 and 242, respectively to reset those outputs to a low or 0 level. The application of the $\overline{PRF}$ pulse is regarded as the beginning of a test cycle. The PRF circuit 30 also controls the circuit 29 to accept echo pulses of the associated transducer 21 only during the predetermined time interval referred to as the window-width (see FIG. 6(b)). The pulse from the PRF circuit 30 is applied to the input 111 of the multivibrator 112.

The multivibrator 112 causes a window delay (see FIG. 6(b)) of a predetermined duration which is applied to the reset input 163 of the flip-flop 162 to cause the 0 output 164 thereof to exhibit a high level. Also, the delay pulse is applied to a reset input 188 of the flip-flop 187 to cause the high level output 197 to assume a low level and the low level output 189 to assume a high level.

The trailing end of the delay pulse applied over the line 113 causes the multivibrator to generate a window-width pulse (see FIG. 6). The end of the window pulse is regarded as the end of a test cycle. At that time the receiver logic circuit 29 decides whether or not to generate a pulse for further controlling the processing of measurements attributed to receipt of echo pulses.

The window pulse is transmitted from the output 116 and applied to the junction point 118 to enable the detectors 120 and 122.

The detection circuit 123 includes facilities for detecting a positive or a negative echo pulse applied by the amplifier 106 to the input terminal 124. It should be observed from FIG. 5, that only when the window signal appears at the junction point 118 are the pair of threshold amplitude detectors 120 and 122 enabled.

The threshold amplitude detector 120 is designed to apply a negative assertion signal to the input 129 of the NOR gate 131 in response to the application of a valid positive echo pulse to the input terminal 124 of the threshold detection circuit 123. On the other hand, the threshold amplitude detector 122 is designed to also apply a negative assertion signal to an input 133 of the NOR gate 131 in response to a valid negative echo pulse.

The threshold detection circuit 123 is designed to apply a signal to the NOR gate 131 only when the first echo pulse is at least a predetermined amplitude or threshold value. An echo pulse of a predetermined minimum amplitude is said to be outside band and causes one of the amplitude detectors 120 or 122 to generate a negative signal. If the amplitude is not at least the predetermined amplitude, the amplitude is said to be inside band and the negative does not appear.

As the polyethylene jacket 13 cools, the amplitude of an echo pulse from the jacket increases. The present system is designed for measurement of thickness and eccentricity as close to the extruder as possible. Hence, the measurement herein will be that of hot polyethylene material. The detectors 120 and 122 are selected and adjusted to detect pulses that are only of a predetermined minimum amplitude which corresponds to that expected at the outwardly facing surface of the polyethylene jacket 13.

Subsequently, the receiver logic circuit 29 tests the first echo pulse to determine if the first echo pulse is not greater than a predetermined duration. Experiments have shown that the first pulse to be expected from the interface of the water and the outwardly facing surface of the polyethylene is of a very short duration, e.g., on the order of one-half microsecond. Contrasted to this, the second echo pulse from the interface of the inwardly facing surface of the polyethylene and the core or the shielding layer is of a duration on the order of 1–2 microseconds. This is due to the polyethylene tending to filter out high frequency energy and the greater reflection at the second interface. Hence, any signals to be valid must meet criteria established with respect to both time duration and amplitude.

Should the amplitude of the first echo pulse exceed a predetermined value, the threshold detector 120 or 122 applies a signal to the input terminal 129 or 133, respectively, of the NOR gate 131. This in turn causes the NOR gate 131 to apply a positive or high voltage level signal to the junction point 136 and 137 into the inverter 138. The inverter 138 then applies a negative signal over the line 139 to the flip-flop 141. This sets the output 143 of the flip-flop 141 to a high level voltage to cause a high level to appear at the junction point 144.

The flip-flop 141 may only be cleared by the application of the $\overline{PRF}$ signal at the beginning of the subsequent measurement cycle.

The high voltage level at the junction point 144 is applied as a true input to the input 196 of the NAND gate 193. As is seen in FIG. 5, the delay $\overline{PRF}$ pulse applied to the input 188 of the flip-flop 187 resets the output 189 to a high level thus causing a positive true to appear at the input 192 of the NAND gate 193. This causes the NAND gate 193 to generate a negative output pulse which signifies the beginning of the measurement cycle and causes the counter 32 to begin counting.

The reason for the application of a delay $\overline{PRF}$ pulse to the input 188 deserves a word of explanation. Should there be a high level at the output 143 of the flip-flop 141 and a $\overline{PRF}$ pulse applied to the inputs 142 of the flip-flop 141 and 188 of the flip-flop 187, the flip-flop 187 may respond more quickly than the flip-flop 141 with positive trues appearing at both inputs 196 and 192 of the NAND gate 193. This would cause a negative pulse of short duration output at the NAND gate 193. But then when the flip-flop 141 is reset, the output 143 assumes a low level which would cause a low level at the output 196 thereby discontinuing the pulse output of the NAND gate 193 and hence the oscillator pulse count.

To avoid this, a delay $\overline{PRF}$ pulse is applied to the input 188 of the flip-flop 187. This delays the reset of the output 189 to a high level to apply a high level at the input 192 of the NAND gate 193 until after the reset of the output 143 of the flip-flop 141 and the essential setting thereof by at least a partially valid threshold pulse I.

The appearance of a high level at the junction point 144 indicates at least a partially valid first echo. A check is initiated to verify this assumption by determining that the duration thereof is approximately 500 nanoseconds and that a time interval or gap occurs thereafter when no signal is present. To this end, the high level at the junction point 144 also causes a high level to be applied to the input 146 of the first holdoff pulse multivibrator 147. The signal at the junction point 144 indicates the presence of a valid echo pulse insofar as amplitude is concerned as determined by one of the threshold detectors 120 or 122.

The application of a signal to the junction point 144 causes the holdoff multivibrator 147 to generate a time delay or holdoff pulse (see FIG. 6(d)) to determine if the first pulse is of valid time duration, e.g., one-half microsecond to qualify as a valid first echo pulse. The holdoff pulse multivibrator 147 is designed to generate a holdoff pulse of a predetermined time length which in this situation is about one-half microsecond. After the one-half microsecond, the trailing edge of the holdoff pulse causes the validation pulse multivibrator 149 to generate a pulse (see FIG. 6(e)) of approximately 500 nanoseconds.

During this time, the pulse causes a high level to appear at the input 153 of the NAND gate 154 to enable the NAND gate. Should the echo pulse have a duration exceeding the holdoff pulse, a high level is applied over the line 156 to the input 157 of the NAND gate 154 from the junction point 136. This causes an assertion of both positive true inputs of the NAND gate and cause a low level at the output 158 thereof.

If the echo pulse exceeds threshold value after the holdoff pulse and during the validation pulse, which would indicate that a valid echo pulse I has not been received because of excessive time duration, the measurement of signal is discarded; if not, the signal is remembered.

The output 164 of the flip-flop 162 is reset or cleared to a high level by the delayed $\overline{PRF}$ pulse as applied to the input 163. If the NAND gate is operated to have a low level at the output 158 indicative of an echo pulse longer than 500 nanoseconds, the flip-flop 162 is set to cause a low level at the output 164 thereof. The low level at the output 164 appears at the junction point 167 and at the so-called D input 168 of the flip-flop 169.

If the D input of the flip-flop 169 is a low level when the clock or C input 171 occurs at the positive trailing edge of the validation pulse generated by the multivibrator 149, the output 174 appears low. This corresponds to a no gap situation — the first echo pulse is invalid. If the output 174 appears low, the NAND gate 178 is not operated and the output 174 remains low. The next $\overline{PRF}$ pulse tends to reset the flip-flop 69. However, since the output 174 is already low, the output remains low.

On the other hand, if the amplitude of the first echo pulse does not exceed threshold level beyond the holdoff pulse (which indicates a valid first echo pulse), a high does not appear at the input 157 of the NAND gate 154. The NAND gate 154 is not operated and does not set the flip-flop 162 and the high at the output 164 appears at the D input 168 of the flip-flop 169. Since D is high when the clock C occurs at the input 171, the output 174 is high, causing a high at the input 177 of the gate 178 to enable the gate. The output 174 remains high until the next cycle of operation when the $\overline{PRF}$ pulse resets the flip-flop 169 and causes the output to exhibit a low level.

Should a high occur at the input 177 of the gate 178, the first echo pulse has been validated as to time and duration. This permits the circuit 29 to begin looking for a second echo pulse.

The high appearing at the junction point 167 causes a high at the input 228 of the NAND gate 227 to enable the gate. The enabling of the NAND gate 227 is such that if the second pulse received is validated, the NAND gate facilitates the generation of a read pulse to cause the count in the counter 32 to be stored.

When the second echo pulse is received by the input 124 of the circuit 29, one of the threshold detectors 120 or 122 functions as described hereinbefore to cause the NAND gate to generate a high at the output 134 thereof. This causes a high to be applied over the line 179 and through the junction point 181 to the input 182 of the already enabled NAND gate 178 to operate the NAND gate.

The operation of the NAND gate 178 (which is due in part to the receipt of the second echo pulse) causes a low level at the output 183 to appear at the input 186 of the flip-flop 187 to set the flip-flop. This conditions the receiver logic circuit 29 to look at the second echo pulse. Also, this indicates the end of the counting cycle (see FIG. 6). The setting of the flip-flop 187 causes a low at the output 189 and hence a negative to appear at the input 192 of the NAND gate 193 to disable the NAND gate and discontinue the production of a low at the output thereof. This causes a discontinuance of the count of the oscillator output by the counter 32 (see FIG. 6(h)).

The remainder of the cycle is devoted to determining the validity of the second echo which would cause the count to be transferred to the buffer (not shown). A validation process is used for the second echo pulse similar to that used to validate the first echo pulse. It will be remembered that the second echo pulse will have a duration on the order of magnitude of ½–2 microseconds. Hence, the portion of the receiver logic circuit 29 which examines the second pulse is constructed with a built-in delay of 1 microsecond. Only then is the pulse examined, and if there is yet threshold amplitude, the pulse is remembered.

The setting of the flip-flop 187 causes the low at the output 197 to go high and be applied along the line 198. The rising edge of the pulse from the flip-flop 187 causes the second holdoff pulse generator 201 to generate a pulse having a duration of approximately 1.0 microsecond.

When the holdoff delay pulse is generated by the multivibrator 201, a signal is sent from the junction point 204 along the line 236 to an input 237 of the amplitude comparator 238 to enable that amplitude comparator. The positive amplitude of the second pulse is checked by the threshold comparator 238 to determine if the amplitude of the second echo exceeds a preset value which is much greater than that of the initial threshold. The amplitude comparator 238, as shown in FIG. 5, checks only positive signals; however, it is within the scope of this invention to include another comparator in the circuit 123 for testing the signal for negative excursions.

In the event that the maximum amplitude of the comparator is exceeded, the comparator 238 applies a low level along the line 241 to an input of the flip-flop 242 to set the flip-flop and cause a high level to appear at the output 243 thereof. The high level at the output 243 is applied along the line 244 to apply the signal to the input 246 of the multivibrator 233 to enable the multivibrator.

The trailing edge of the pulse generated by the multivibrator 201 appears at the multivibrator 208 and causes the second pulse validation multivibrator 208 to generate a validation pulse (see FIG. 6(g)) of approximately 500 nanoseconds. The second validation pulse multivibrator 208 causes a high to be transmitted from the output 209 along a path 211 and applied to the input 212 of the NAND gate 213.

Also, as is seen in FIG. 5, if either the positive or negative threshold is exceeded during the duration of the validation pulse, a signal is applied from the junction point 136 along the line 179 to the junction point 181 and then along the line 216 and applied as a high to the input 214 of the NAND gate 213. The threshold testing of the second echo pulse is necessary in order to determine if there is in fact an excursion.

Should highs be applied to the input 214 from one of the threshold detectors 120 or 122 indicating the second echo pulse is present, and to the input 212 from the multivibrator 208, a low level appears at the output 217 to set the flip-flop 219. The setting of the flip-flop 219 causes a high level over the line 224 to appear at the input 226 of the NAND gate 227 which had been enabled previously.

The NAND gate 227 is operated and then applies a low over the line 231 to the one-shot multivibrator 233 which is designed to generate the read pulse and which had been enabled previously by the amplitude validation.

The generation of a low level pulse by the NAND gate 227 and applied to the multivibrator 233 (see FIG. 5) indicates that the first pulse was less than one microsecond duration with an appropriate gap to the second echo pulse and that the second echo pulse was of a ½–2 microseconds duration.

Upon cessation of the window pulse, a decision is made as to whether or not to generate the read pulse. The cessation of the window pulse is indicated by a signal applied by the ono-shot monostable multivibrator 114 over the line 248 to the input 247 of the multivibrator 233. The multivibrator 233 previously enabled by an input 246 from the multivibrator 242 now has an input applied thereto from the NAND gate 227. The multivibrator 233 is now operated to instruct the counter 32 to record the pulse width from the NAND gate 193 upon receiving the trailing edge of the window pulse at the input 247.

The oscillator 34 generates pulses which are counted by the counter 32 beginning at an initiation point on the first hold-off pulse and ending at the initiation of the second echo pulse with the difference therebetween being a measure of the time interval between the echo pulses. The counter 32 includes three decade counters, hundreds, tens and units, with a 4-bit memory associated with each of the decade counters. If appropriate pulses are generated at outputs 158 and 217 with respect to the echo pulses I and II in a positive-negative sequence, then a read pulse is generated at the conclusion of the window-width of the window-pulse. This causes the count stored in the register of the counter 32 to be transferred from the counting portion of the counter into the memory of the counter. Then the count from the memory is applied to the digital-to-analog converter 36 to direct the digital-to-analog converter to provide a continuous voltage output indicative of the jacket thickness.

It should be noted that the previous count stored in the buffer is not updated until the next subsequent valid read pulse is generated to transfer the associated count to the buffer. The circuit 25 is designed so that a previous count is held in the buffer until the next valid count is received and is not discarded if an invalid count is made.

In addition, the digital-to-analog converter includes a light which is driven for approximately 800 microseconds between successive ones of the read pulses. Four of the lights are associated with the apparatus 20. If acceptable measurements are being made, the lights will be in an on condition approximately 80 to 90 per cent of the time. On the other hand, if the signal is lost there will be no light at all which may be indicative of an out-of-position crystal 21 or a defective channel. The light for each of the channels 22—22 is used as a warning light to the operator should the system fail and also during the set-up of the apparatus. The light is on continuously if a continuous stream of read pulses are generated. An 80% duty cycle signal would drive the light under such a condition. When a cable oscillates through the field of view of the crystal, the light will tend to flicker as no excitation will be present when the crystal cannot "see" the cable.

The apparatus 20 has certain features which may be traced to the thickness of the jacket 13 under test. Generally, jackets 13—13 which have a thickness of at least 20 mils present no problem. However, if the jacket thickness is below that, problems may be encountered. The receiver logic circuit 29 is designed with respect to the first holdoff pulse generation and validation portion to accommodate 20 mils per microsecond.

For example, the holdoff pulse multivibrator 147 must generate a holdoff pulse at least equal to the ringing decay time of the associated crystal 21. It is possible to select a crystal that has a decay time as low as 0.5 microsecond.

Then, the validation pulse generator 149 must generate a pulse of a duration of at least equal to one cycle of the ringing of the associated crystal 21. The crystal 21 may ring at 5 megacycles so that the pulse width may be as low as 200 nanoseconds.

With these two durations determined, the successful operation of the apparatus 20 is dependent upon the second echo (echo II) not being received until the conclusion of the first holdoff and validation process for the first echo. This requirement may not be met if the apparatus 20 is used to measure jackets having a thickness of the order of magnitude of less than 20 mils.

Of course, with some of the more commonly used plastic insulating materials for the thinner wall jackets, the time between echo pulses is longer because the speed of the ultrasonic pressure wave in that particular material may be slower. In hot polyethylene, the expected speed is 20 mils per microsecond. So for polyethylene, to go to a jacket thinner than say 20 mils may involve problems in echo pulse overlap. However, for a given thickness in hot polyvinyl chloride, the time lapse between echoes I and II may be longer so that even though the jacket is thinner, any overlap is avoided.

Of course, it must be understood that it is within the scope of this invention to measure the thickness between a first surface and a second surface spaced from and opposite to the first surface with several layers of differing materials therebetween. Also, instead of measuring a cable jacket thickness, the methods and apparatus would be used to measure the thickness of successive sections of a covering layer enclosing successive sections of a solid core or a hollow core as in tubing.

It should be noted that in some cable structures where, for example, an inner jacket, is in engagement with a core wrap or other material that the second echo pulse of each associated echo pulse pair is stretched out. However, it will be remembered that the development of the off signal by the NAND gate 193 occurs upon receipt of the initial portion of the second echo pulse for purposes of thickness measurement. Also, of course, the peak magnitude and duration characteristics of the second echo pulse will be satisfied. On the other hand, if the core wrap is spaced from the inwardly facing surface of the jacket, the air acts as an open switch through which there is substantially no transmission. Again, the testing and use of the second echo pulse in the thickness measurement is not impaired.

It is to be understood that the above-described arrangements are simply illustrative of the principles of the invention. Other arrangements may be devised by those skilled in the art which will embody the principles of the invention and fall within the spirit and scope thereof.

What is claimed is:

1. A method of monitoring ultrasonically an elongated member, which includes the steps of:
    transmitting an ultrasonic pulse into an elongated member and then receiving a first echo pulse reflected from one surface of the member and then receiving an associated second echo pulse from an opposite surface of the member;

developing an on signal upon receipt of a qualifiying first echo pulse having at least a predetermined minimum amplitude from the one surface of the member;

generating control signals to establish a predetermined time interval beginning with the receipt of a first echo pulse having the predetermined amplitude;

developing an off signal upon validation of a qualifying first echo pulse within the predetermined time interval and upon receipt of an associated second echo pulse having a predetermined minimum amplitude from the opposite surface of the material and occurring after the predetermined time interval with the time duration between the on signal and the off signal being related to the elapsed time between the receipt of the first echo pulse from the one surface of the member and the receipt of the associated second echo pulse from the opposite surface of the member;

measuring the elapsed time between the on signal and the off signal; and causing relative motion between the elongated member and the source of ultrasonic pulses.

2. A method of measuring automatically ultrasonically an elongated material, which includes the steps of:

advancing an elongated material;

transmitting an ultrasonic pulse into the material and then receiving a first echo pulse reflected from one surface of the material and then receiving an associated second echo pulse from an opposite surface of the material;

developing an on signal and an off signal upon the receipt of associated first and second echo pulses each having predetermined distinguishable characteristics which include amplitude and duration, with the time duration between the on signal and the off signal being related to the elapsed time between the receipt of the first echo pulse from the one surface of the material and the receipt of the associated second echo pulse from the opposite surface of the material; and converting the measured elapsed time into a signal, the magnitude of which is proportional to a parameter of the elongated material which is to be measured.

3. A method of measuring automatically ultrasonically the thickness of successive sections of elongated material, which includes the steps of:

advancing successive sections of an elongated material;

transmitting an ultrasonic pulse into the material and then receiving a first echo pulse reflected from one surface of the material and then receiving an associated second echo pulse from an opposite surface of the material;

developing automatically an on signal upon receipt of a qualifying first echo pulse having a predetermined minimum amplitude from one surface of the material;

generating control signals to establish first and second time intervals beginning with the receipt of a first echo pulse having the predetermined amplitude;

developing an off signal upon receipt of a qualifying first echo pulse which does not exceed the predetermined minimum amplitude after the first time interval and upon receipt of an associated second echo pulse having a predetermined minimum amplitude from the opposite surface of the material and occurring after the second predetermined time interval with the time duration between the on signal and the off signal being related to the elapsed time between the receipt of the first echo pulse from the one surface of the material and the receipt of the associated second echo pulse from the opposite surface of the material;

the time duration between the on signal and the off signal being related to the thickness of the material; and determining the thickness of the material in accordance with the elapsed time between the on signal and the off signal.

4. An apparatus for monitoring ultrasonically an elongated member, which includes:

means for transmitting an ultrasonic pulse into an elongated member and receiving a first echo pulse reflected from one surface of the member and receiving an associated second echo pulse from an opposite surface of the member;

means responsive to the receipt of a qualifying first echo pulse from the one surface of the member and having at least a predetermined minimum amplitude for developing an on signal;

means for generating control signals to establish a predetermined time interval beginning with the receipt of a first echo pulse having the predetermined minimum amplitude;

means responsive to the receipt of a qualifying first echo pulse which is validated within the predetermined time interval and to the receipt of an associated second echo pulse having a predetermined minimum amplitude from the opposite surface of the member and occurring after the predetermined time interval for developing an off signal with the time duration between the on signal and the off signal being related to the elapsed time between the receipt of the first echo pulse from the one surface of the member and the receipt of the associated second echo pulse from the opposite surface of the member;

means for measuring the elapsed time between the on signal and the off signal; and means for causing relative motion between the elongated member and at least the transmitting means.

5. An apparatus for monitoring ultrasonically successive sections of an elongated material, which includes:

means for advancing an elongated material;

means for transmitting an ultrasonic pulse into the material and then receiving a first echo pulse reflected from one surface of the material and then an associated second echo pulse from an opposite surface of the material;

means for developing an on signal and an off signal distinguishable from each other upon receipt of associated first and second echo pulses having predetermined distinguishable characteristics which include amplitude and duration, with the time duration between the on signal and the off signal being related to the elapsed time between the receipt of the first echo pulse from the one surface of the material and the receipt of the associated second echo pulse from the opposite surface of the material; and means for converting the measured elapsed time into a signal, the magnitude of which is proportional to a parameter of the elongated material which is to be measured.

6. An apparatus for measuring automatically ultrasonically successive sections of an elongated material, which includes:

means for advancing successive sections of an elongated material;

means spaced from the material under test for transmitting ultrasonic pulses into the material and for then receiving a first echo pulse reflected from one surface of the material and then receiving an associated second echo pulse from an opposite surface of the material;

means connected to the pulse transmitting and receiving means for developing an on signal and an off signal with the time duration between the on signal and the off signal being related to the elapsed time between the receipt of the first echo pulse from one surface of the material and the receipt of the associated second echo pulse from the opposite surface of the material;

the signal developing means capable of developing an on signal and an off signal only upon the receipt by the transmitting and receiving means of a valid sequence of echo pulses including a first echo pulse which exceeds a predetermined minimum amplitude within a first preset time interval and a second echo pulse received after a second preset time interval;

means connected to the developing means and the transmitting and receiving means and rendered effective by the invalidity of at least one of the echo pulses for inhibiting the developing means; and means connected to the pulse transmitting and receiving means and rendered effective upon receipt of on and off signals for indicating the elapsed time.

7. An apparatus for measuring distance in a medium having at least a first reflecting surface and a second reflecting surface, which includes:

means for cyclically transmitting ultrasonic pulses inside the medium through the first reflecting surface;

means for receiving the transmitted pulses and associated echo pulses received from the reflecting surfaces;

means connected to the receiving means and responsive to the receipt of associated echo pulses of predetermined minimum amplitudes during a predetermined time period for generating a signal having a duration proportional to the time interval which separates the echo pulses from the first and the second reflecting surfaces;

means connected to the generating means for measuring the time interval;

means in one state for operating the measuring means and when in another state for inhibiting the measuring means; and means connected to the receiving means for amplitude detection of the pulses at a predetermined level and of the existance of a predetermined duration of the echo pulse from the first reflecting surface at the predetermined minimum amplitude level and of the occurence of at least a predetermined time interval from the beginning of the echo pulse from the first reflecting surface to the beginning of the echo pulse from the second reflecting surface to control the operating and the inhibiting means.

8. The apparatus of claim 7, wherein the means for controlling the operating and inhibiting means is responsive to a sequence of valid echo pulses from the first and second reflecting surfaces, a valid echo pulse from the first surface being one which exceeds a predetermined minimum amplitude for less than one time interval and a valid echo pulse from the second surface being one which exceeds a predetermined minimum amplitude beyond another time interval to operate the measuring means, and is responsive to the invalidity of at least one of the echo pulses for inhibiting the operation of the measuring means.

9. An apparatus for measuring automatically ultrasonically the thickness of successive sections of elongated material, which includes:

means for advancing successive sections of the elongated material;

means for tranmitting an ultrasonic pulse into the material and then receiving a first echo pulse reflected from one surface of the material and then receiving an associated second echo pulse from an opposite surface of the material;

means for developing automatically an on signal upon receipt of a first echo pulse of predetermined minimum amplitude from the one surface of the material;

means for generating control signals to establish first and second time intervals beginning with the receipt of a first echo pulse having the predetermined minimum amplitude;

means responsive to the receipt of a qualifying first echo pulse which does not exceed the predetermined minimum amplitude beyond the first time interval and to the receipt of an associated second echo pulse having a predetermined minimum amplitude from the opposite surface of the material and occurring after the second time interval for developing an off signal with the time duration between the on signal and the off signal being related to the elapsed time between the receipt of the first echo pulse from the one surface of the material and the receipt of the associated second echo pulse from the opposite surface of the material, further, the time duration between the on signal and the off signal being related to the thickness of the material; and means for determining the thickness of the material in accordance with the elapsed time between the on signal and the off signal.

10. An apparatus for measuring ultrasonically the thickness of successive sections of a cable jacket, which includes:

means for advancing successive sections of a cable:

means spaced from the cable for transmitting ultrasonic pulses into the cable and for receiving echo pulses therefrom;

means connected to the pulse transmitting and receiving means for developing an on signal and an off signal with the time duration between the on signal and the off signal being related to the elapsed time between the receipt of a first echo pulse after reflection from an outer surface of the jacket and the receipt of an associated second echo pulse after reflection from an opposite inwardly facing surface of the cable jacket;

the signal developing means capable of developing an on signal and an off signal only upon the receipt by the transmitting and receiving means of the associated echo pulses during a predetermined time interval, each of the pulses having at least a predetermined minimum amplitude and the time during which the predetermined minimum amplitude of the first echo pulse occurs is not greater than a predetermined time;

means connected to the developing means and responsive only upon receipt of an associated second pulse having predetermined duration and amplitude characteristics for converting the elapsed time between the on signal and the off signal into a quantity indicative of the thickness of the jacket; and means connected to the converting means for indicating the quantity indicative of the thickness of the jacket.

11. An apparatus for testing ultrasonically the thickness of successive sections of a jacket of a cable, which includes:

means for advancing successive sections of a cable;

a transducer spaced from the cable, the transducer and the cable being positioned in a coupling medium, the transducer having a line of focus which is transverse of the path of the cable;

means for exciting the transducer to emit pressure waves toward and then through the cable jacket, the engagement of the pressure waves with the outwardly facing surface of the cable causing a first echo pulse to be reflected therefrom and the engagement of the pressure wave with the inwardly facing surface of the jacket causing a second echo pulse associated with the first echo pulse to be reflected therefrom;

means for receiving and amplifying the echo pulses;

logic means connected to the amplifying means for validating a sequence of first and second echo pulses received during a predetermined time interval which have preestablished distinguishable amplitude and duration characteristics;

means rendered effective by the receipt of a valid first echo pulse and the receipt of a second echo pulse having a preset minimum amplitude for developing an on signal and an off signal with the time duration between the on signal and the off signal being the elapsed time between reflections from the outwardly and the inwardly facing surfaces of the cable and related to the thickness of the cable jacket;

means connected to the developing means for measuring the elapsed time;

means responsive to the validation of the first and the second echo pulses for causing the recordation of an output indicative of the jacket thickness; and means for cyclically causing the exciting means to cause the transducer to emit pressure waves and for conditioning the logic means for another cycle of operation.

12. A method of measuring the thickness of an article having first and second surfaces bounding a material of known acoustical properties, which comprises the steps of:

establishing a medium having known acoustical characteristics contiguous with the first surface of an article;

generating a longitudinal wave in the medium directed toward the first surface, one part of the wave being reflected therefrom back through the medium as a first echo, the other part of the wave passing through the first surface and the article to the second surface, and a portion of the other part being reflected back through the article and the medium as a second echo;

generating a quantity proportional to the time interval between a first echo which exceeds a predetermined intensity within one time period and a second echo which occurs after a predetermined time period following the beginning of the first pulse to establish the thickness of the article; and inhibiting the generation of quantity when either of the predetermined intensity or duration characteristics do not exist.

13. The method of claim 12, wherein the article is a cable jacket and the surfaces thereof define the thickness of the jacket.

14. An apparatus for measuring the thickness of an article having first and second surfaces bounding a material of known acoustical properties, which comprises:

means for establishing a medium having known acoustical characteristics contiguous with the first surface of an article;

means for generating a longitudinal wave in the medium directed toward the first surface, one part of the wave being reflected therefrom back through the medium as a first echo, the other part of the wave passing through the first surface and the article to the second surface, and a portion of the other part being reflected back through the article and the medium as a second echo;

means for generating a quantity proportional to the time interval between a first echo which exceeds a predetermined intensity within one time period and a second echo which occurs a predetermined time period following the beginning of the first pulse to establish the thickness of the article; and means rendered effective when either of the predetermined intensity or duration characteristics do not exist for inhibiting the generation of any quantity.

15. The apparatus of claim 14, wherein the article is a cable jacket and the surfaces thereof define the thickness of the jacket.

16. The method of claim 3, wherein the elongated material is a jacket of a communications cable and the thickness of the jacket is measured.

* * * * *